Sept. 8, 1959  A. SIMON  2,902,945
MATERIAL HANDLING SYSTEM
Filed Jan. 27, 1954  4 Sheets-Sheet 1
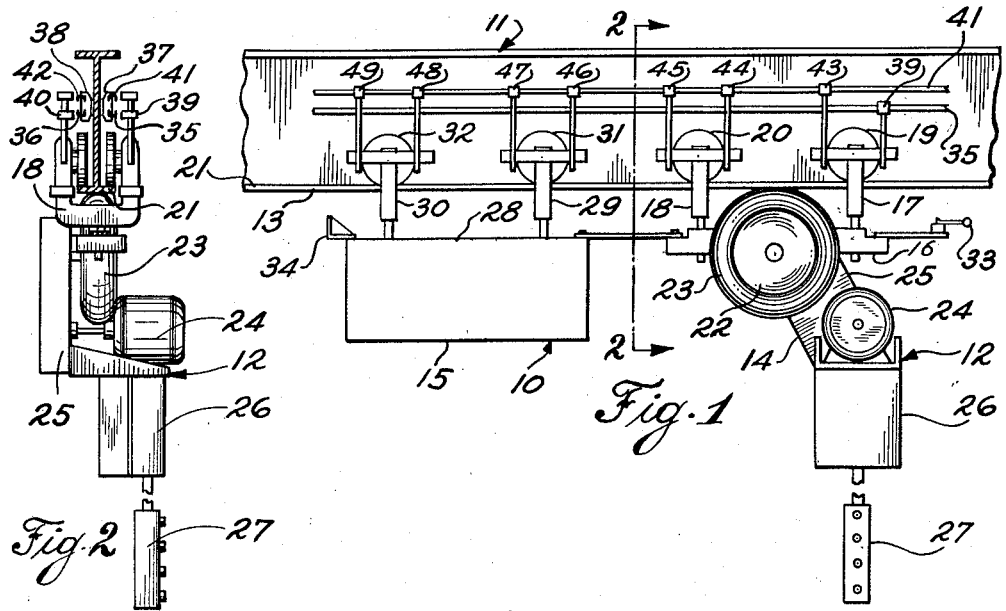
Fig. 1
Fig. 2
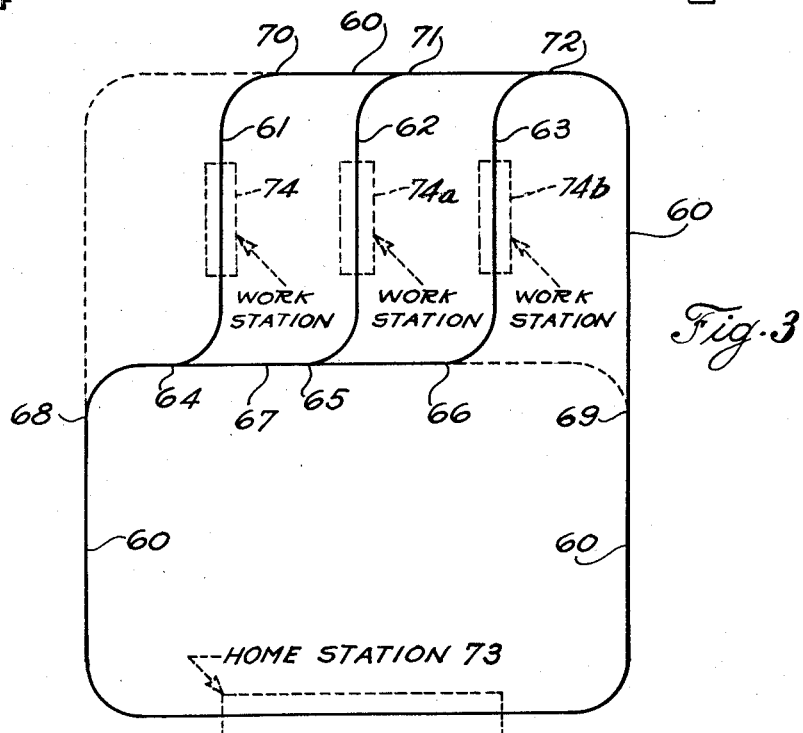
Fig. 3
INVENTOR.
ANDREW SIMON
BY
RICHEY, WATTS, EDGERTON & McNENNY
ATTORNEYS Sept. 8, 1959                    A. SIMON                    2,902,945
                          MATERIAL HANDLING SYSTEM
Filed Jan. 27, 1954                                    4 Sheets-Sheet 2

Fig. 4

INVENTOR.
ANDREW SIMON
BY
RICHEY, WATTS, EDGERTON & McNENNY
B D Watts
ATTORNEYS

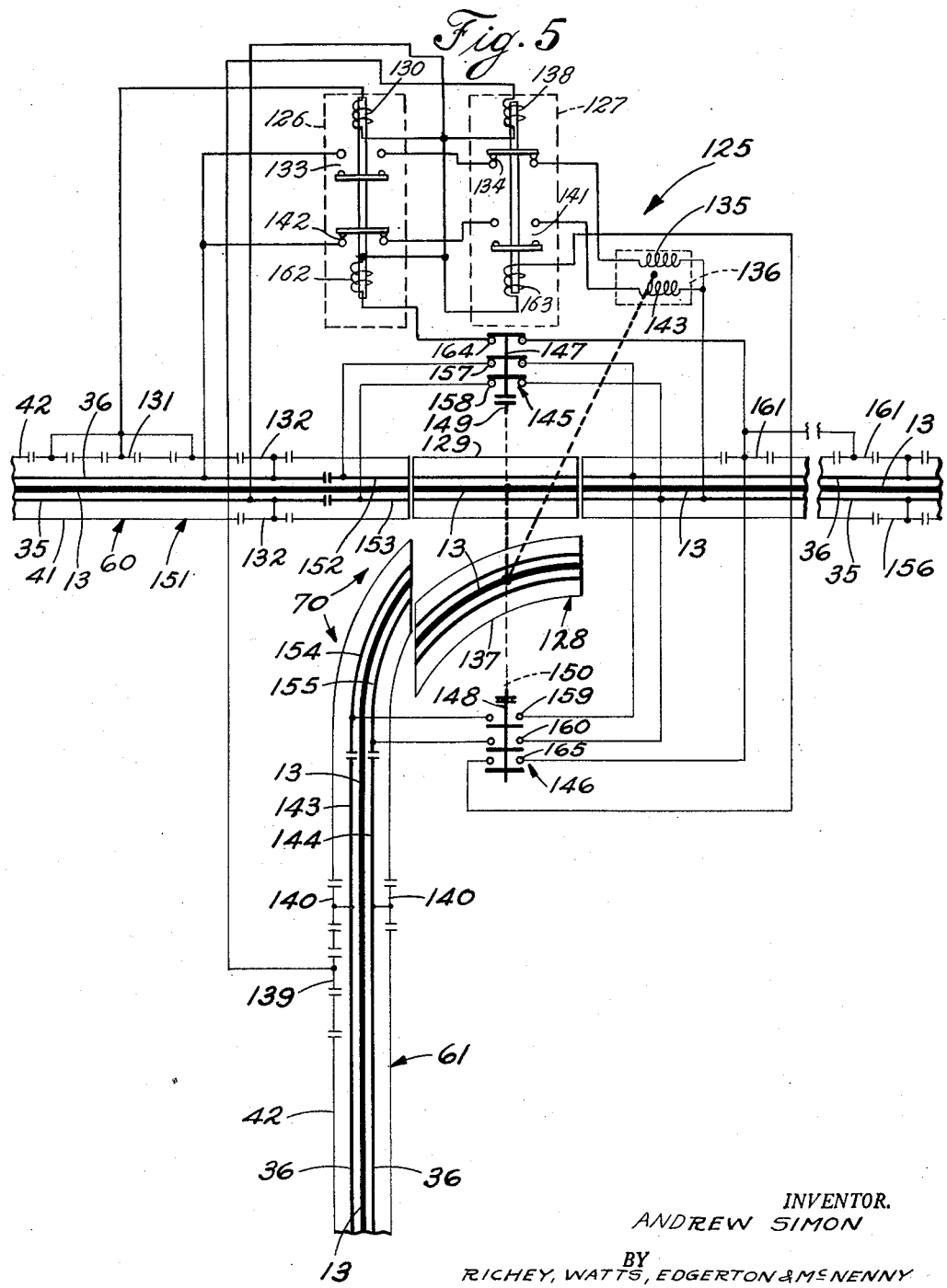

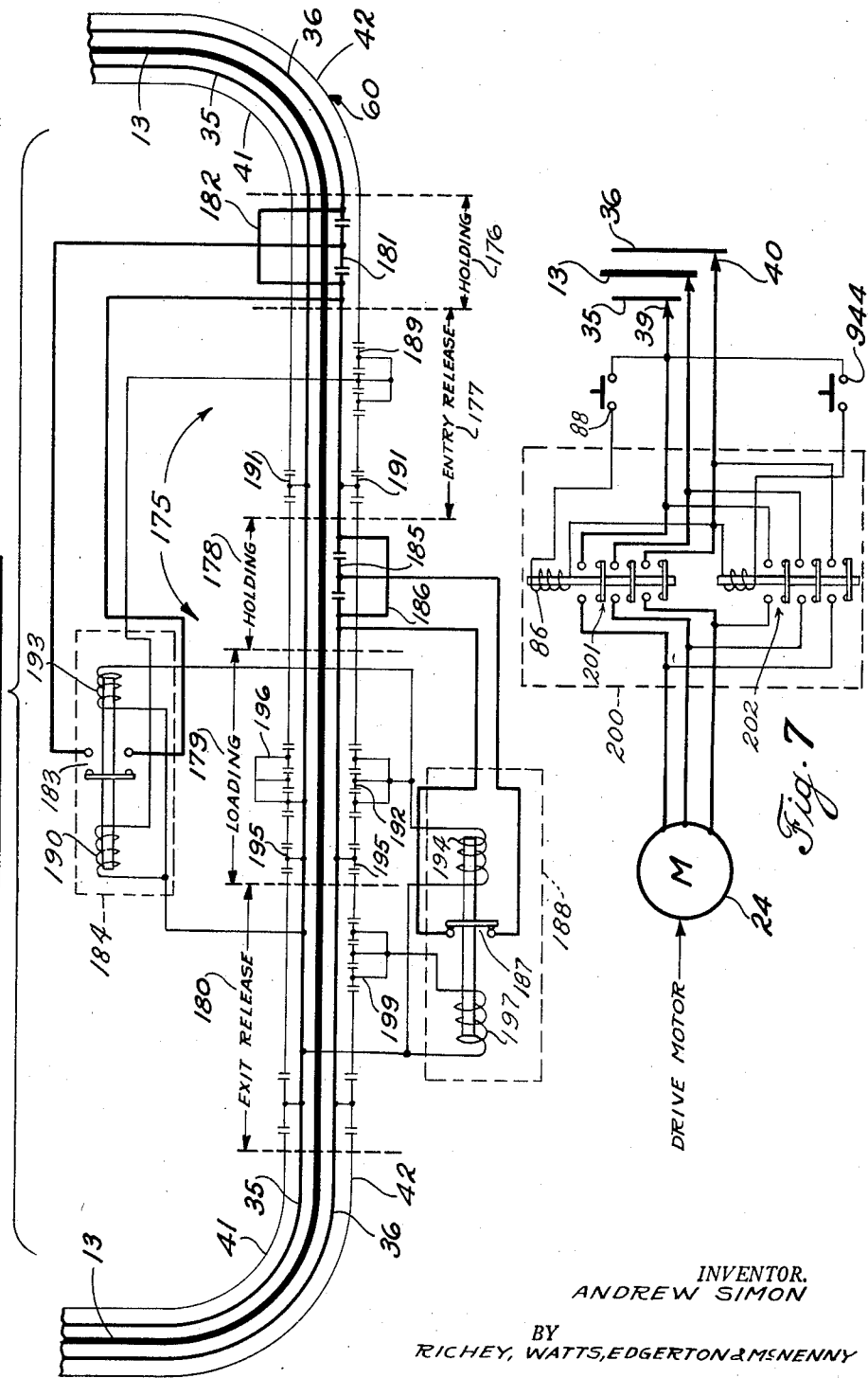

United States Patent Office 2,902,945
Patented Sept. 8, 1959

2,902,945

MATERIAL HANDLING SYSTEM

Andrew Simon, Cleveland, Ohio, assignor to The American Monorail Company, Cleveland, Ohio, a corporation of Ohio Application January 27, 1954, Serial No. 406,553

7 Claims. (Cl. 104—88)

This invention relates to article and material handling apparatus and, more particularly, to a traveling conveyor system which is adapted to carry or distribute articles or materials from a given station to a predetermined one of a number of stations.

An object of the invention is to provide a material handling system in which a material carrier may be directed from a home station to any of a number of work stations and returned to the home station and to do so without intervention by operators.

An object of the invention is to provide a material handling system employing traveling carriers which may be preset to travel from one location to another and which may be returned to the first location in the same manner.

Another object of the invention is to provide a track system for a material handling apparatus in which all necessary control operations are performed from the traveling material carrier and in which successive carrier units may be sent to the same or different locations without interference one from the other.

Still another object of the invention is to provide a material handling system in which any desired number of material carriers may be employed without danger of collision between the carriers and in which suitable preselector control may be employed for each carrier without affecting the operation of the remaining carriers.

There are many occasions for the employment of material handling apparatus in which the articles to be handled must be carried over extended distances and between warehouses and the like, or between different stages of production processes. In such circumstances, substantial economies may be effected by employing traveling carrier systems in which the desired station information is preset into a traveling material carrier at a home staiton so that the material carrier will proceed to a work station under its own control. A novel system for accomplishing the so-called preselector function, e.g. of providing a control which may be adjusted so that the material carrier will be directed to the proper station, is described in my copending application, Serial No. 369,925, filed July 23, 1953.

The present invention is concerned with the application of the above-referenced preselector system in a material handling apparatus of the type described. The conveyor system incorporates a track in the form of a loop in which the traveling carrier proceeds in a single direction around the loop, e.g. from a home station to any of a number of work stations. The work stations are situated on side tracks which are effectively parallel to each other so that the traveling carrier may enter any of the side tracks and, hence, to any of the work stations. Similarly, the exit ends of the side tracks intersect the main track so that a traveling carrier on any of the side tracks may be returned to the home station.

In accordance with the invention, novel track control and operating circuits are provided at the entry end of the side tracks so that not more than one traveling carrier may enter a given side track and so that, if a second carrier is directed to the same side track, the second carrier will be held on the main track until the traveling carrier already in the side track has started to leave the side track. Novel track control and operating circuits are provided at the exit ends of the side tracks whereby traveling carriers approaching an intersection on the main track or the side track control the movement of the track switch to the exclusion of a traveling carrier approaching the intersection on the remaining track. Finally, novel track control and operating circuits are provided at the home station so that, when a number of the traveling carriers are returned to the home station in close succession, the succeeding carriers will be stopped and then advanced into a loading position after the preceding carrier has departed.

Other objects, features and advantages will become more apparent from a consideration of the following detailed description taken in connection with the accompanying drawings, in which:

Fig. 1 is a side view showing the traveling unit and a portion of the overhead track of the conveyor system of the invention;

Fig. 2 is a section view taken in the direction 2—2 in Fig. 1;

Fig. 3 is a schematic diagram of the track of the conveying system of the invention and showing the disposition of the stations along the track;

Fig. 4 is a schematic representation of the entry end of a side track with the main track and the entry control circuits for the track switch together with a diagram of the electrical circuits of the traveling conveyor unit;

Fig. 5 is a schematic representation of the intersection of the exit end of a side track with the main track and the exit control circuits therefor;

Fig. 6 is a schematic representation of a portion of the track and the control circuits at the home station; and Fig. 7 is a schematic diagram of the power circuit of the traveling carrier.

Referring now to Fig. 1, the traveling conveyor system 10 includes an overhead stationary track 11 and a number of traveling material carriers such as the carrier 12. The traveling conveyor system is adapted for installation and use in mills or factories or other places wherein it is required that articles or materials be transported by a carrier between any of a number of locations. The overhead track system includes a monorail 13 which is suitably supported or suspended above the floor of the mill and extends continuously between the stations or locations which are to be served by the system. The monorail 13 serves as a support and guide for the traveling carrier 12 and is arranged in a manner well known in the art.

The material carrier 12 comprises a tractor 14 and one or more trailers such as the trailer 15. The tractor comprises a main frame 16 which includes two trolley yokes 17 and 18. The yokes 17 and 18 hold two pairs of trolley wheels 19 and 20 which support the tractor from the upper side of the lower flange 21 of the monorail 13. The tractor is driven along the track by a drive wheel 22 which has a rubber tire 23 in tractive engagement with the underside of the flange 21. The drive wheel 22 is turned by a drive motor 24 and a suitable power transmission 25. Electrical controls for the drive motor 24 are incorporated in a cabinet 26, while means for performing the necessary manual control operations are provided by a manual control 27.

The trailer 15 comprises a frame 28, two trolley yokes 29 and 30 and two pairs of trolley wheels 31 and 32 for suspending the trailer from the monorail 13. The trailer 15 is, of course, suitably designed to carry the loads of the particular application of the conveyor system. Any suitable number of trailers within the power capabilities of the tractor 14 may be hitched behind the trailer 15.

A limit switch 33 on the tractor is connected in the control circuit for the drive motor 24 and is adapted to engage a bumper 34 provided on each of the trailers so that if the traveling unit runs into another similar unit, the drive motor will be deenergized.

The tractor 14 is powered by electrical energy which is continuously supplied to the drive motor 24 by electrical conductors disposed along the monorail 13. Two power bars 35 and 36 are supported on opposite sides of the monorail 13 by insulators 37 and 38, and are connected to a suitable electrical generator at some point along the system. The power bars 35 and 36 are engaged by two collectors 39 and 40 which are mounted upon the tractor 14 and receive the electrical energy from the power bars. The power collectors 39 and 40 are suitably connected to the drive motor through the control circuits as will be explained hereinafter.

The traveling carrier 12 incorporates suitable electrical circuits which may be adjusted in a manner such that, when started by an operator, the carrier will travel to a selected destination and stop, having automatically operated such track switches or other ancillary apparatus as may be necessary to reach that destination. To that end, the conveyor track incorporates a pair of selector bars 41 and 42 which are mounted on opposite sides of the rail 13 by two insulators 37 and 38, respectively.

The selector bars 41 and 42 are engaged by two sets of collectors which are mounted upon the material carrier 12 and function to transmit and receive control currents to and from the selector bar. These collectors comprise a part of the preselector system which controls the movement of the traveling unit and may be designated generally as preselector collectors as distinct from the power collectors 39 and 40. One set of preselector collectors e.g. 43, 44, 45, 46, 47, 48 and 49, appears in the side view of Fig. 1, while the remaining set of preselector collectors, e.g. 53, 54, 55, 56, 57, 58 and 59, is shown in the diagram of Fig. 4. The individual collectors of the two sets are disposed on opposite sides of monorail 13, although such an arrangement is not essential to the practice of the invention.

The various collectors are supported by the trolley yokes of the material carrier and are suitably connected by cables to the control circuits in the cabinet 26 of the tractor 14. In the arrangement shown, the trailers which are pulled by the tractor 14 carry their own selector collectors for reasons which will appear hereinafter. Such an arrangement is, of course, not necessary to the practice of the invention and, under certain circumstances, it may be desirable to mount all the collectors on the tractor.

Referring now to Fig. 3, the track system of the invention comprises a main track 60 and a number of side tracks 61, 62 and 63. The entry ends of the side tracks 61, 62 and 63 are connected at a number of intersections 64, 65 and 66 with a branch 67 of the main track 60. The branch 67 of the main track joins the main track at an intersection 69 at the exit end thereof. The side tracks 61, 62 and 63 join the main track 60 at intersections 70, 71 and 72 at the exit ends thereof. Each track intersection includes a track switch which has two positions so that a traveling carrier may either enter or leave a side track or proceed along the main track. The track switches are of a known type and may be pneumatically or hydraulically operated in response to electrical control impulses which energize solenoids for controlling the pneumatic or hydraulic actuating devices of the switch.

The conveyor system of the invention is adapted to be utilized for transporting articles or materials from a home station 73 on the main track to any one of a number of work stations 74, 74a and 74b which are located along the side tracks 61, 62 and 63, respectively. It will be understood, however, that the system may, with equal facility, be utilized for transporting the articles and materials from the work stations to the home station or from one work station to another.

Referring now to Fig. 4, there is shown a part of the branch track 67, a typical intersection with the side track 61, entry control circuit for affecting the operation of a track switch 76 together with the control circuit 77 of the traveling carrier 14. As explained in the application previously referred to, the apparatus includes two preselector systems which constitute an internal circuit control 78 for controlling the operation of the traveling unit from fixed locations along the track and an external circuit control for operating ancillary apparatus at fixed positions along the track such as the control circuit 79 from the traveling carrier. The internal circuit control 78 includes a selector switch 80, the collectors 44–49, inclusive, the selector bar 41 and the circuits associated therewith. The external circuit control 79 includes a selector switch 81, the collectors 54–59, inclusive, the selector bar 42 and the circuits associated therewith.

The collectors 43 and 53 provide a reference for the remaining collectors and engage two insulated sections 82 and 83, of the selector bars 41 and 42, which are connected to the power bars 35 and 36. The collectors 43 and 53 are connected to an impulse relay 84 which is energized when the collectors engage the selector bar sections 82 and 83.

The selector collectors 44–49 and 54–59 are spaced at predetermined distances from the collectors 43 and 53 and are adapted to engage insulated sections which, when the associated selector switches 80 and 81 are adjusted to a corresponding position, interconnect the circuits of the traveling unit with those at the fixed location. Thus, the section 85 of the selector bar 42 is engaged by the collector 54 and circuits connected to the section 85 are connected to the control circuits 77 carried by the traveling carrier when the selector switch 81 is adjusted to contact 54.

The collectors 43 and 53 will be designated hereinafter as "impulse collectors" and the selector bar sections 82 and 83 will be designated as "impulse sections." Similarly, the selectors 44–49 and 54–59 will be designated as "selector collectors," while the associated sections such as the section 85 will be designated as "selector sections."

The control circuit 77 includes a forward drive solenoid 86 of the drive motor starter which is connected through overload relay contacts 87 and the normally open contacts of the forward drive switch 88 of the manual control 27 to the power collectors 39 and 40. Automatic forward operation is provided by a power relay 89 which has a latch coil 90 thereof connected to the power collector 39 and to the normally open contacts of the run switch 91 of the manual control 27. A set of normally open contacts 92 of the power relay are connected to the forward starter through a set of normally closed contacts 93 of the stop switch 94 of the manual control 27. One contact of a set of normally open contacts 941 of the stop switch 94 is connected to the unlatch coil 942 of the power relay 89 and the other contact of the set is connected to power collector 39. Actuation of stop switch 94 disconnects contacts 93, but connects contacts of set 941 whereby the circuit of coil 942 becomes closed to energize the coil and the contacts 92 are opened by switch 94 when the carrier is stopped. A reverse drive solenoid 943 is connected to the normally open contacts 944 of the reverse switch of the manual control 27. It will be seen that the material carrier may be controlled by the manual control 27 and may be caused to move continuously by actuating the run switch 91.

The adjustable contact of the selector switch 80 is connected to the unlatch coil 942 of the power relay through a pair of normally closed contacts 95 of the selector relay 84, and thence to the power collector 40 through the bumper switch. When, therefore, the one of the selector collectors 44–49 to which the selector switch 80 is set engages a selector bar which is appropriately spaced from the impulse section 82, the unlatch coil 942 will be energized to open the contacts 92 and stop the traveling unit.

The selector relay 84 includes a pair of normally open contacts 96 which are connected between the adjustable contact of the selector switch 81 and the power collector 40. When, therefore, the contacts 96 are closed by reason of the engagement of the impulse collectors 43 and 53 with impulse sections 82 and 83, the circuit associated with the external circuit control 79 is completed through the selector switch 81 and the appropriate one of the selector collectors 54–59.

The track switch 76 includes a straight portion 98 which serves as a continuation of the main track, and a curved portion 99 for interconnecting the main track 67 with the side track 61. The actuator 97 of the track switch 76 includes a solenoid coil 100 which serves to move the section 98 into a side track position, that is, with the section 99 interconnecting the main track with the side track 61. Similarly, a second solenoid 101 serves to shift the switch to a straight-through track position, that is, with the straight portion 98 aligned with the main track 67. The entry control circuit 75 provides means for energizing and deenergizing the solenoids 100 and 101 in accordance with impulses imparted through the external circuit control 78.

The entry control circuit 75 includes two latch relays 102 and 103 which are connected to the selector bar 42 for operation by the external circuit control 79. The latch relay 102 controls the movement of the track switch 76 to the side track position while the relay 103 controls the movement of the track switch 76 to the straight-through position.

The organization of the entry control circuit 75 may best be understood by consideration of the operation of the circuit taken with reference to Fig. 4. The position of the collectors of the traveling carrier shown in Fig. 4 is such that the circuit 75 has been energized to shift the track switch to the side track position. In the condition shown, a latch coil 104 of relay 102 has been energized by the external circuit control 79 through the selector section 85 of the selector bar 42. Upon energization of the latch coil 104, the contacts 105 are closed to energize the solenoid 100 of the track switch actuator, which, in turn, actuates the necessary apparatus to cause the track switch 76 to move to the side track position shown. The contacts 106 of the second latch relay 103 are connected in series with the contacts 105 and the solenoid 100 for reasons which will be explained hereinafter. Movement of the track switch to the side track position is completed in time for the material carrier to enter the curved portion 99 of the track switch and continue into the side track 61.

If the track switch 76 were left in the side track position, a second carrier following the first would be shunted into the side track 61 whatever the setting of the selector switches of that unit. Accordingly, provision is made, whereby, after the first carrier has passed over the track switch 76 and into the side track 61, the entry control circuit 75 returns the track switch 76 to a straight-through position.

As the traveling carrier moves along the side track 61 toward the work station 74, it reaches a position where the impulse collectors 43 and 53 engage two impulse sections 107 and 108 and the selector collector 54 engages a selector section 109. A selector section 110 is engaged by the selector collector 44 for stopping the traveling unit at this location.

The selector section 109 is connected to a latch coil 111 of the second latch relay 103 so that, as the selector collector 54 engages the selector section 109, the latch coil is energized. Upon energization of the latch coil 111, the contacts 106 are opened to deenergize the solenoid 100 while contacts 112 and 113 are closed.

The contacts 113 of relay 103 are connected to a latch coil 114 of the relay 102 and energize that coil to close the contacts 115 and open the contacts 105 of the relay 102. Upon closure of contacts 115, the solenoid 101 is energized through contacts 112 and the track switch 76 moves into the straight-through position.

The traveling carrier, having been stopped at the work station 74 by the internal circuit control 78, will remain at that location until the manual control 27 is actuated by an operator. The carrier may, of course, be loaded or unloaded at that station and the manual control will be actuated when the carrier is to be returned to the home station.

When the track switch 76 was returned to its straight-through position, the control circuit 75 was left in such a condition that a second carrier moving along the branch track 67 could not possibly actuate the track switch 76 to enter the side track 61. Otherwise, if the selector switch of a second carrier corresponding to the selector switch 81 were adjusted to the selector collector corresponding to the selector collector 54, the carrier would enter the side track 61 and collide with the first carrier. Accordingly, the track switch 76 may be actuated by a second carrier only after a first carrier has left the side track 61.

To this end, there is positioned beyond the work station 74 a selector section 116 which is spaced from a pair of impulse sections 117 and 118 a distance corresponding to the adjustment of the selector switch 81, e.g. the same as the spacing of the sections 85 and 83 and 109 and 108. As the traveling carrier moves from the work station 74 to return to the home station 73, the selector section 116 is energized and an unlatch coil 119 of the second latch relay 103 is energized. Upon energization of the unlatch coil 119, the contacts 112 and 113 of relay 103 are opened, while contacts 106 of that relay are closed. The control circuit 75 is, therefore, left in a condition whereby the contacts 105 may be closed by energization of the latch coil 104 to energize the solenoid coil 100 of the track switch actuator. Such energization will shift the track switch 78 to the side track position and will take place only when the external control selector switch of the second traveling carrier is properly adjusted to energize the external selector section 85.

When the track switch 76 is operated to a side track position and after the first carrier has proceeded into the side track, a certain time elapses before the track switch 76 is returned to a straight-through position. Accordingly, means are provided whereby a second carrier will be stopped at a point on the main track ahead of the track switch until such time as the track switch 76 is returned to a straight-through position. A section 120 of the power bar 36 is connected through a normally closed contact 121 of relay 102 to the power bar 36. When the unlatch coil 104 of relay 102 is energized to close contacts 105, the contacts 121 are opened to deenergize the power bar section 120. A carrier following the carrier which has operated the circuit 76 will, therefore, be stopped at the dead section of the power bar and remain in that position until the latch coil 114 of relay 102 is energized to return the track switch 76 to the straight-through position and reenergize the power bar section 120 to start the carrier.

The control circuits shown in Fig. 4 are associated with the intersection 64, side track 61 and work station 74. Similar control circuits are provided for intersection 65, side track 62 and work station 74a and intersection 66, side track 63 and work station 74b. The circuit may, of course, be utilized for controlling the track switch at intersection 68 providing appropriate selector bar sections and connections therefor.

Referring now to Fig. 5, the exit control circuits of the invention are illustrated in connection with the intersection 70 of the side track 61 with the main track 60. The exit control circuit 125 includes two latch relays 126 and 127 which are connected to the selector bar 42 for operation by the external circuit control 79 referred to in Fig. 4.

The track switch 128 is shifted to a side track position by a traveling carrier approaching the intersection 70 on the side track 61 or to a straight-through position by a traveling carrier approaching the intersection on the main track 60.

The latch relay 126 controls the movement of the track switch 128 to a straight-through position in which the straight section 129 of the track switch interconnects the two portions of the main track 60. The latch relay 126 includes a latch coil 130 which is connected to the power bar 35 and to a plurality of selector bar sections designated generally at 131.

A pair of impulse sections 132 are associated with the selector sections 131 so that upon the approach of a traveling carrier along the main track 60, the latch coil 130 will be energized. Upon energization of coil 130, the normally open contacts 133 of relay 126 are closed, thus completing the circuit which includes the power bar 36, normally closed contacts 134 of relay 127, solenoid coil 135 of the track switch actuator 136 and the power bar 35. The solenoid coil 135 is thereby energized to move the track switch 127 to the straight-through position.

The latch relay 127 controls the movement of the track switch 128 to a side track position in which the curved section 137 interconnects the side track 61 with the main track 60. The latch relay 127 includes a latch coil 138 which is connected to the power bar 35 and to selector bar section 139 of the side track 61. The selector section 139 is associated with a pair of impulse sections 140 and is spaced from those sections a distance equal to the spacing between the sections 109 and 108 of the side track 61. A material carrier approaching the intersection 70 along the side track 61 will thus energize the latch coil 138. Upon energization of the latch coil 138, the normally closed contacts 134 are opened to deenergize solenoid coil 135 and normally open contacts 141 are closed to complete the circuit from the power bar 35 through the normally closed contacts 142 of latch relay 126, solenoid coil 143 of the track switch actuator 136 and the power bar 36. The solenoid coil 143 is thereupon energized to move the track switch 128 to the side track position.

It is an important feature of the invention that the cross connection between the contacts of the relays 126 and 127 prevents a simultaneous energization of the solenoid coils 135 and 143 by two different carriers which approach the intersection 70 along the main track 60 and the side track 61 at the same time. However, it will be apparent that, if the two carriers approach the intersection simultaneously, the carrier which first energizes the latch coil of the associated relay will cause the track switch 128 to be shifted to the track on which that carrier is approaching the intersection. The remaining carrier will not operate the track switch and, unless stopped, will run into the open intersection. To this end, the control circuit includes a power baffle which deenergizes the power bars of a section of the track on which the second carrier is approaching in order to stop the second carrier before it reaches the intersection. After the first carrier has passed through the intersection, the baffling circuit shifts the track switch to the alternate position and reenergizes the power bars to cause the second carrier to resume its interrupted journey.

The baffle circuit includes two limit switches 145 and 146 which are actuated by the track switch 128. The limit switch 145 is closed by movement of the track to the straight-through position, whereupon the limit switch 146 is opened. Conversely, when the track switch 128 moves to the side track position, the limit switch 146 is closed while limit switch 145 is opened. The representation of Fig. 5 in which the armatures 148 and 147 of the switches are engaged by bumpers 149 and 150 is, of course, purely schematic and any suitable mechanism may be employed.

Two power bars 35 and 36 of the approach section 151 of the main track 60 have two sections 152 and 153 insulated from the remaining portion thereof so that they are not energized with the bars 35 and 36. Corresponding sections 154 and 155 of the side track 61 are insulated from the power bars 35 and 36 of that track. The sections 152 and 153 of the main track 60 are connected to the power bars 35 and 36 of the section 156 of the main track 60 through the contacts 157 and 158 of the limit switch 145 so that those sections are energized when the track switch 128 is in a straight-through position and the limit switch is closed. Similarly, power bar sections 154 and 155 are connected to the power bar sections 35 and 36 through the contacts 159 and 160 of limit switch 146 so that those sections are energized when the track switch 128 is in a side track position and the switch 146 is closed. Conversely, the sections 152 and 153 are deenergized by movement of the track switch 128 to the side track position while the sections 154 and 155 are deenergized by the movement of the track switch 128 to the straight-through position.

The baffle circuit serves also to cause the track switch 128 to be shifted to the alternate position when the traveling carrier which has control of the track switches passes through the intersection to the section 156 of the main track 60. To this end, a plurality of selector bar sections designated generally at 161 of the track section 156 are connected to unlatch coil 162 of relay 126 and unlatch coil 163 of relay 127 through the contacts 164 and 165 of limit switches 145 and 146, respectively. Upon energization of the selector section 161, the unlatch coil of the relay associated with the position of the track relay switch for which the limit switch is closed is energized. Thus, as shown in Fig. 5, with the track switch 128 in the straight-through position, the limit switch 145 is closed and the unlatch coil 162 of relay 126 is energized through the contacts 164 thereof. Accordingly, contacts 133 are opened to deenergize the straight-through solenoid 135 and contacts 142 are closed to energize the side track solenoid 143 through the contacts 141 which have already been closed by the traveling carrier on the side track 161. Thus, each traveling carrier is allowed to proceed through the intersection and along the main track whatever the time or manner of approach to the intersection in relation to any other traveling carrier.

Referring now to Fig. 6, the home station control circuit there illustrated is utilized to control the movement of the carriers upon their return to the home station 73. In particular, where a number of carriers arrive at the home station in a relatively short interval of time, the home station control circuit serves to hold the carriers and advance them one by one for loading.

The control apparatus performs several separate functions which may be referred, for convenience of description, to the various locations along the track 60 at which they are performed. The sections of the main track at the home station may be designated separately as a first holding section 176, an entry-release section 177, a second holding section 178, loading section 179 and exit-release section 180.

The holding section 176 functions to stop traveling carriers as they approach the home station upon their return from the work stations. The holding section 176 includes a section 181 of the power bar 36 which is isolated from the remainder of the power bar, that is, it is deenergized or dead. The ends of the power bar 36 adjacent the section 181 are bridged by a jumper 182 while the section 181 is connected to the power bar 36 through the contacts 183 of a relay 184. Similarly, the second holding section includes an isolated section 185 of the power bar 136 which is bridged by a jumper 186. The section 185 of the power bar is connected to the main power bar 36 through contacts 187 of a second relay 188.

The entry-release section 177 functions to deenergize the power bar section 181 of the holding section 176 and includes a plurality of selector sections designated generally at 189 which are connected to the unlatch coil 190 of the relay 184. A pair of impulse sections 191, associated with the selector sections 189, operate the external circuit control apparatus of a traveling unit as it passes through the section 177 so that the unlatch coil 190 is energized to open the contacts 183. The power bar section 181 of the holding section 176 is thereby deenergized and a traveling unit entering the holding section 176 will be stopped.

The power bar section 181 of the first holding station 176 is energized and the power bar section 185 of the second holding station 178 is deenergized from the loading section 179. To this end, a plurality of selector sections 192 are connected to the latch coil 193 of relay 184 and to the unlatch coil 194 of relay 188. A pair of impulse sections 195 and a plurality of selector bar sections 196 of the internal circuit control power bar 41 are provided for stopping the traveling carrier at the loading station. As a traveling carrier enters the station, the energization of the solenoid coils 193 and 194 by the external circuit control of the carrier, will cause contacts 183 to be closed and contacts 187 to be opened. Upon closure of contacts 183, the power bar section 181 is energized to start a carrier which may be held in section 176 while power bar section 185 of the second holding station 178 is deenergized to again stop that carrier before it enters the loading section. As explained above, the power bar section 181 is deenergized as the traveling carrier passes through the entry-release section 177 so that the next succeeding traveling carrier is stopped in the first holding section 176.

After the carrier is loaded, the manual control 27 is operated to start the carrier toward its destined work station. As the carrier passes through the exit-release section, the latch coil 197 of relay 188 is energized through the selector sections 199 and contacts 187 are closed. Thereupon, the circuit to the power bar section 185 is completed and another carrier which had been stopped in holding section 178 is advanced into the loading section 179.

In operation, if the home station 73 is empty, the power bar sections 181 and 185 are energized and an incoming traveling carrier will move directly into the loading section 179 and stop. Simultaneously, the unlatch coil 194 of relay 188 is energized to open the contacts 187 and deenergize the power bar section 185. Simultaneously therewith, the latch coil 193 is energized to close contacts 183 which were opened as the carrier passed through the entry-release section 177 and energize the power bar section 181 of the first holding section 176. A second traveling carrier approaching the home station will thus pass into and stop in the section 178. The second carrier, in passing through the entry-release section 177, energizes the unlatch coil 190 of relay 194 to open contacts 183 and deenergize power bar section 181 so that a third traveling carrier will be stopped in the first holding section 176. After the first carrier has been loaded, the unit will be started from the loading section 179 by operation of the manual control. As the unit leaves that section and passes through the exit-release section 180, the latch coil 197 of relay 188 is energized to close contacts 187 and energize the power bar section 185. The second carrier then moves into the loading section 179 and stops, whereupon the third carrier will be advanced into the second holding section. The power bar section 181 of the first holding section 176 is then deenergized by the third carrier to stop a succeeding traveling carrier in the first holding section 176.

It will be apparent that the holding circuits of the invention function to expedite the loading operations and automatically insure the orderly dispatch of the traveling units.

A number of the circuit arrangements in the preceding description have included connections between several adjoining selector bar sections of either the external control selector bar 42 or the internal circuit control selector bar 41. This arrangement is necessary in order that several traveling carriers, whose selector switches may be adjusted to different settings, may operate the same circuit or be operated by the same circuit. Thus, for example, the exit control circuit of Fig. 5, if employed at intersection 72, would necessarily have to respond to the external circuit control settings of the selector switch 80 for the entry control circuits at intersections 64 and 65. Thus, selector sections corresponding in spacing to those at the intersections 64 and 65 must, at least, be provided at 131. Similarly, the selector sections 196 of the internal circuit selector bar 41 in the loading section 179 must include sections corresponding to every one of the stations at which the traveling carriers stop.

Referring now to Fig. 7, there is shown a schematic diagram of the power circuits for the drive motor 24 of the tractor 14. The drive motor 24 may be a three-phase alternating current motor of the type well known in the art and is supplied with alternating current voltage from the two power bars 35 and 36 and the monorail 13.

A motor starter 200 includes a forward coil 86, associated forward drive contacts 201, the reverse drive coil 943 and associated reverse contacts 202. The coils 86 and 943 are energized by the switches 88 and 944 of the manual control 27, respectively, as shown in Fig. 4. Three-phase alternating current is supplied to the starter from the power bars 35 and 36 through the power collectors 39 and 40 and from the monorail 13 through a power collector 202.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. In a material handling system, the combination of a track system including main tracks, a plurality of side tracks having the ends thereof successively disposed along portions of the main tracks, an entry switch at the entry end of each side track and an exit switch at the exit end of each side track, a traveling carrier movable along said track system and having a propelling motor, a first power line having an insulated section and a second power line, said power lines being disposed along said track system and adapted to be connected to a source of power, first and second selector bars along the track system and each including a first insulated section and the second bar having insulated sections spaced apart different predetermined distances from the first insulated section in advance of each of the different entry switches, the said first sections of said first and second selector bars being connected directly to the first and second power lines respectively, first collectors on the carrier engageable with said first sections, a plurality of second collectors on the carrier spaced apart at distances conforming to said predetermined distances between said insulated sections of the second said selector bar and engageable with one of said second insulated sections of the second selector bar at each of the said entry switches when said first collectors make contact with said first section, and first means for shifting said entry switches, said first means comprising a circuit on the carrier including a terminal collector engaging said first power line, a first selector switch having a plurality of contacts connected through selector collectors to said second sections of said second selector bar and a movable arm selectively engageable with said contacts and connected through a first normally open set of contacts to said terminal collector, and pulse solenoid actuated means connected to said first collectors to close said set of contacts, and a second means for shifting the entry switches including a first latch relay having a latch coil and an unlatch coil, said unlatch coil being connected to said second power line and to the said second section of said second selector bar for energizing said switch actuating solenoid coil and thereby moving said entry switch, said latch relay having a contactor with two terminals, one of which is connected to said insulated section of said first power line and the other of which is connected to an uninsulated portion of said first power line, the said insulated section being deenergized when the entry switch has been moved to the side track position.

2. The combination of elements set forth in claim 1 combined with means for stopping the carrier on a side track after it has passed through an entry switch into side track position, said first and second selector bars along the side track each including first and second insulated sections spaced apart different predetermined distances, said means including a pulse circuit on the carrier having impulse collectors engageable with said first sections of said first and second selector bars along the side track and including a first solenoid coil, a second circuit on the carrier including a second selector switch on the carrier having a plurality of contacts connected through selector collectors with said second sections of said first selector bar along the side track and a movable arm selectively engageable with said plurality of contacts and connected through a second normally open set of contacts of said pulse solenoid coil and an unlatch solenoid to the first said power line for stopping the traveling conveyor on the side track.

3. The combination of elements set forth in claim 1 combined with means to prevent a shifting of the entry switch to side track position while a carrier is on the side track, said means including a second latch relay having a latch coil and an unlatch coil, said unlatch coil being connected to the second power line and to a second insulated section of the second selector bar along the side track.

4. The combination of elements set forth in claim 1 combined with means to shift the exit switch to side track position when a carrier is on the side track, said means including said first latch relay having its latch coil connected to one of the second sections of said second selector bar and to said second power line, said first latch relay having a contactor with two terminals, one of which is connected to an uninsulated part of the first power line and the other terminal of which is connected to an uninsulated part of the second power line through a switch shifting solenoid coil.

5. The combination of elements set forth in claim 4 combined with means to shift the exit switch to main track position when a carrier on the main track approaches the exit switch when the switch is in the side track position, said means including a second latch relay and having a latch coil connected to all the second sections of the said second selector bar and connected to said second power line, said second latch relay having a contactor with two terminals, one of which is connected to an uninsulated part of the first power line and the other terminal of which is connected to an uninsulated part of the second power line through a main track switch shifting solenoid coil.

6. The combination of elements set forth in claim 5 combined with means to prevent the shifting of the exit switch to side track position when one carrier on the main track is controlled the switch and a second carrier approaches on the side track, said means including the two said latch relays, each of said relays having a second contactor normally closed and each of said contactors having two terminals, the first terminal of each contactor is connected to the uninsulated part of the first power line, the second terminal of one is connected to the uninsulated part of the second power line through the main track switch shifting solenoid coil, the second terminal of the other is connected to the uninsulated part of the second power line through the side track switch shifting solenoid, such that when said means are actuated simultaneously the exit track switch remains in original position.

7. The combination of elements set forth in claim 6 combined with means set to return the said exit track switch to the opposite position after a carrier reaches the exit side of the exit switch from either track and providing a second carrier has approached the switch on a track different from that of the first carrier and has exercised a control on one of said latch relays, said means including main and side track unlatch relay coils of said first and second latch relays and one end of each of said unlatch coils is connected to the uninsulated part of the second power line, and the other end of the main track unlatch relay coil connects to the connected second sections of the second selector bar through a mechanical contactor with two terminals that close when the exit track switch is in the main track position and the other end of the side track unlatch relay coil connects to the connected second sections of the second selector bar through a mechanical contactor with two terminals that close when the exit track switch is in the side track position.

References Cited in the file of this patent

UNITED STATES PATENTS

| | | |
|---|---|---|
| 829,842 | Carpenter | Aug. 28, 1906 |
| 893,402 | Briggle | July 14, 1908 |
| 1,561,434 | Jones | Nov. 10, 1925 |
| 1,650,575 | Wallace | Nov. 22, 1927 |
| 2,201,013 | Rosenthal | May 14, 1940 |
| 2,293,397 | McKeige | Aug. 18, 1942 |
| 2,401,115 | Spafford | May 28, 1946 |
| 2,486,221 | Spafford | Oct. 25, 1949 |
| 2,614,506 | Mullerheim | Oct. 21, 1952 |
| 2,688,931 | Spafford | Sept. 14, 1954 |
| 2,688,932 | Heil | Sept. 14, 1954 |
| 2,688,933 | Spafford | Sept. 14, 1954 |
| 2,688,934 | Quail | Sept. 14, 1954 |
| 2,714,355 | Benson | Aug. 2, 1955 |

FOREIGN PATENTS

| | | |
|---|---|---|
| 423,502 | France | Feb. 16, 1911 |
| 264,145 | Germany | Sept. 17, 1913 |
| 307,493 | Germany | Sept. 3, 1918 |

OTHER REFERENCES

"Automatic Materials Handling," by the Louden Machine Co. of Fairfield, Iowa, U.S.A. Printed in U.S.A. 5-46. Contains 24 pages plus cover.